No. 755,018. PATENTED MAR. 22, 1904.
P. D. LAIBLE.
BOTTLE WASHING MACHINE.
APPLICATION FILED JUNE 4, 1903.
NO MODEL. 6 SHEETS—SHEET 1.

WITNESSES:
Henry Krug
W. M. Everett

INVENTOR
Philip D. Laible,
BY
Charles H. Pell
ATTORNEY.

No. 755,018. PATENTED MAR. 22, 1904.
P. D. LAIBLE.
BOTTLE WASHING MACHINE.
APPLICATION FILED JUNE 4, 1903.
NO MODEL. 6 SHEETS—SHEET 2.

WITNESSES: INVENTOR:
Henry Krug Philip D. Laible,
Russell M. Everett BY Charles H. Pell,
ATTORNEY.

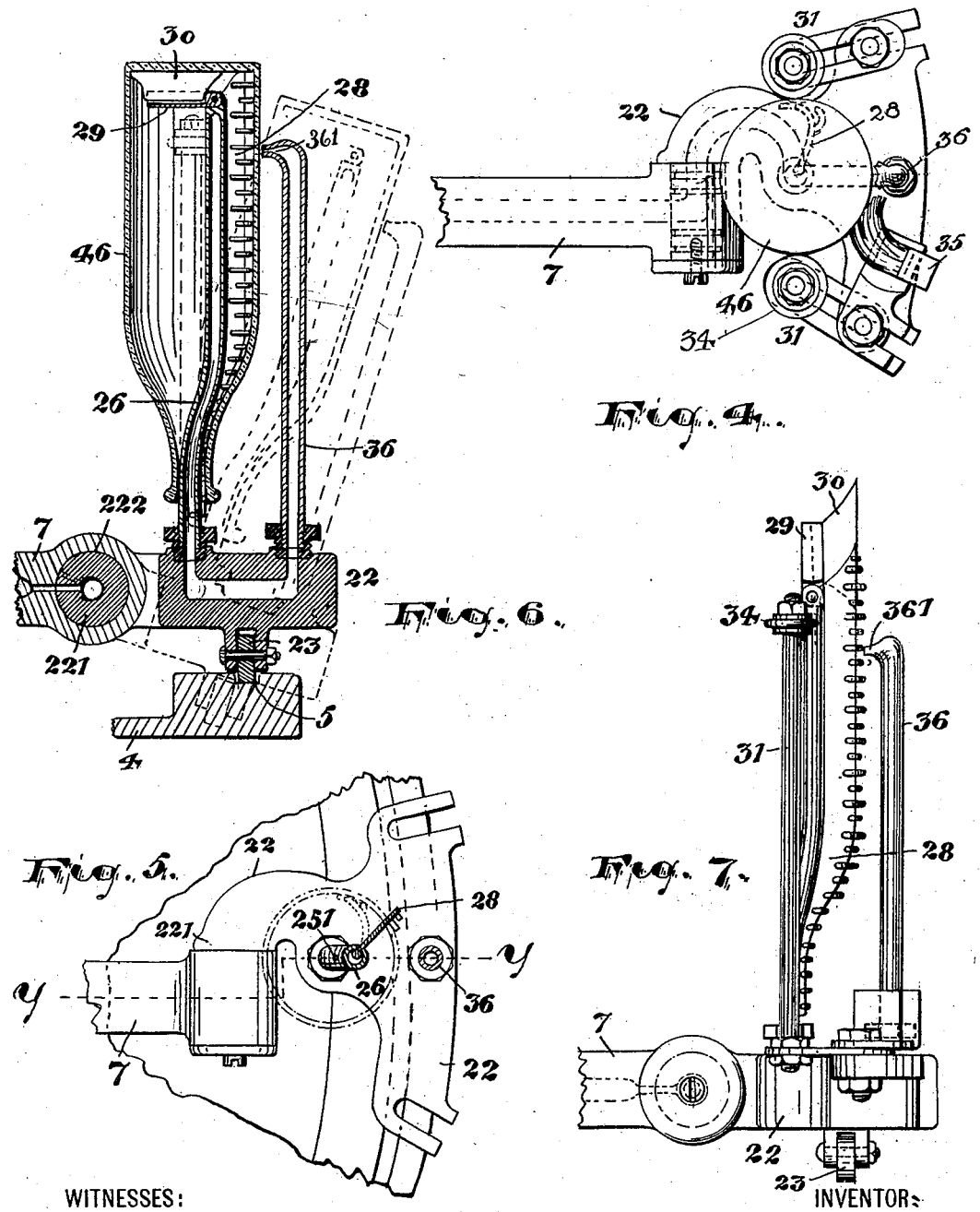

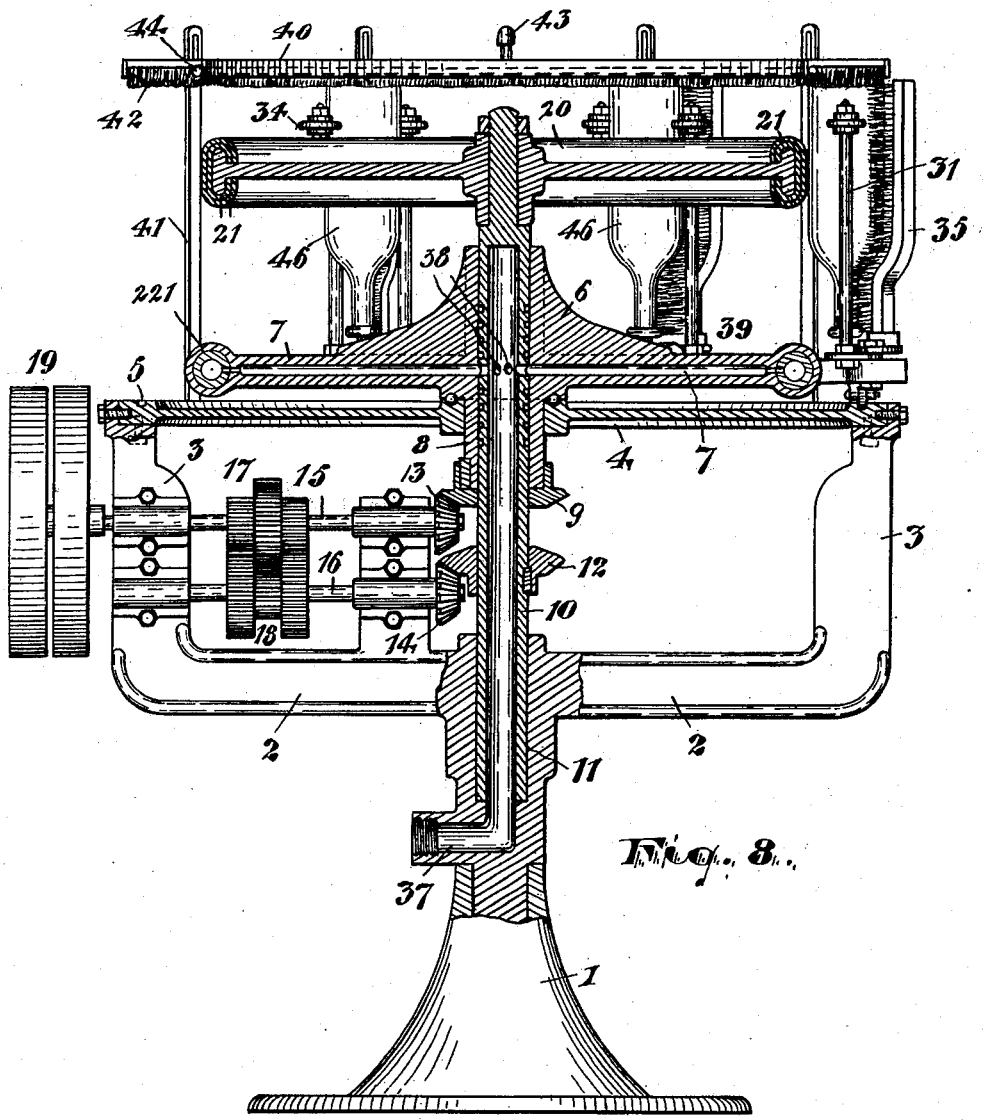

No. 755,018. PATENTED MAR. 22, 1904.
P. D. LAIBLE.
BOTTLE WASHING MACHINE.
APPLICATION FILED JUNE 4, 1903.
NO MODEL. 6 SHEETS—SHEET 5.
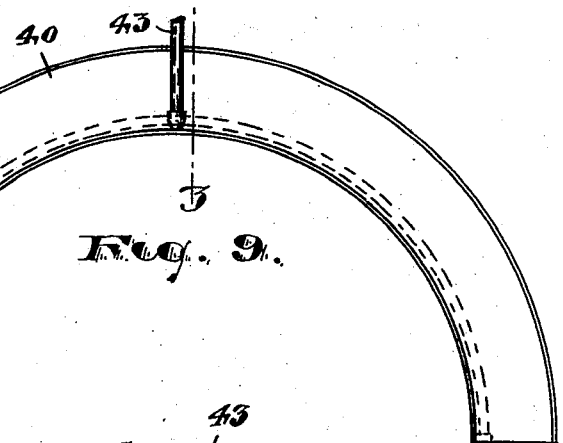
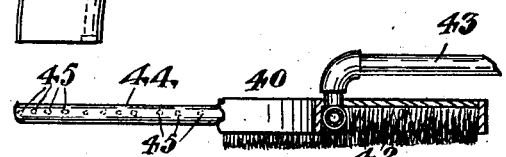
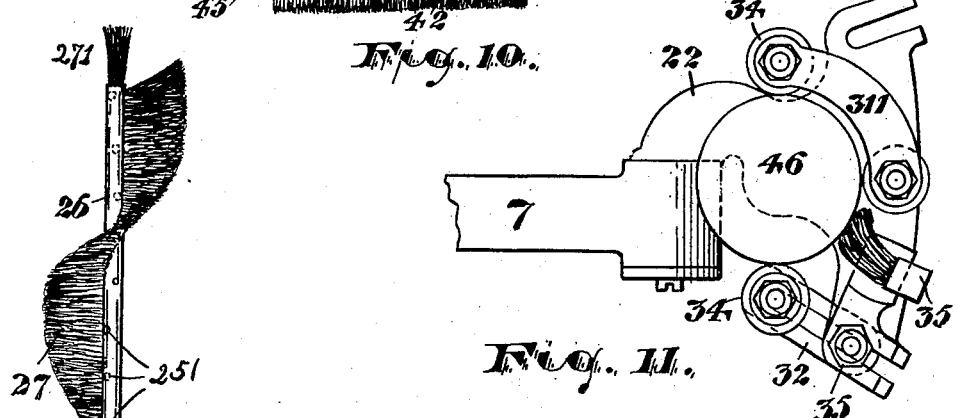
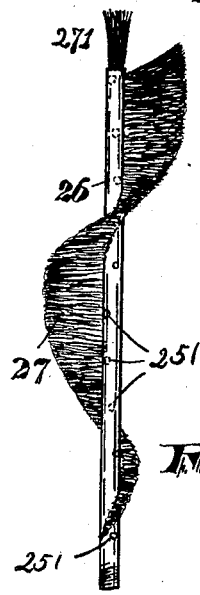
WITNESSES: INVENTOR
Ralph Lancaster. Philip D. Laible,
Russell M. Everett. BY
Charles H. Pell
ATTORNEY.

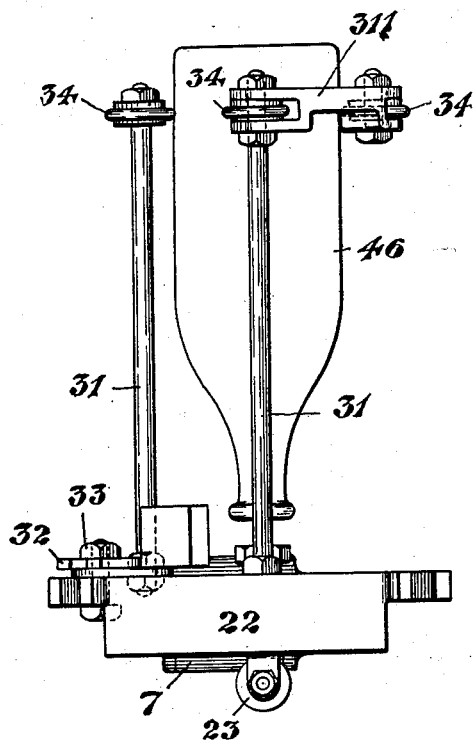

No. 755,018.

Patented March 22, 1904.

UNITED STATES PATENT OFFICE.

PHILIP D. LAIBLE, OF NEWARK, NEW JERSEY.

BOTTLE-WASHING MACHINE.

SPECIFICATION forming part of Letters Patent No. 755,018, dated March 22, 1904.

Application filed June 4, 1903. Serial No. 160,000. (No model.)

*To all whom it may concern:*

Be it known that I, PHILIP D. LAIBLE, a citizen of the United States, residing at Newark, in the county of Essex and State of New Jersey, have invented and produced new and original Improvements in Bottle-Washing Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The objects of this invention are to provide a machine to be employed by bottlers and the like for washing bottles, to save labor and expense and enable the bottles to be washed automatically and in rapid succession, to secure a simple construction and one not liable to get out of order, to enable the bottle to be easily inserted in and removed from the machine, to insure every portion of the surface of the bottles being reached by the brushing appliances and water, and to obtain other advantages and results, some of which may be hereinafter referred to in connection with the description of the working parts.

The invention consists in the improved bottle-washing machine and in the arrangements and combinations of parts of the same, all substantially as will be hereinafter set forth, and finally embraced in the clauses of the claim.

Figure 1:
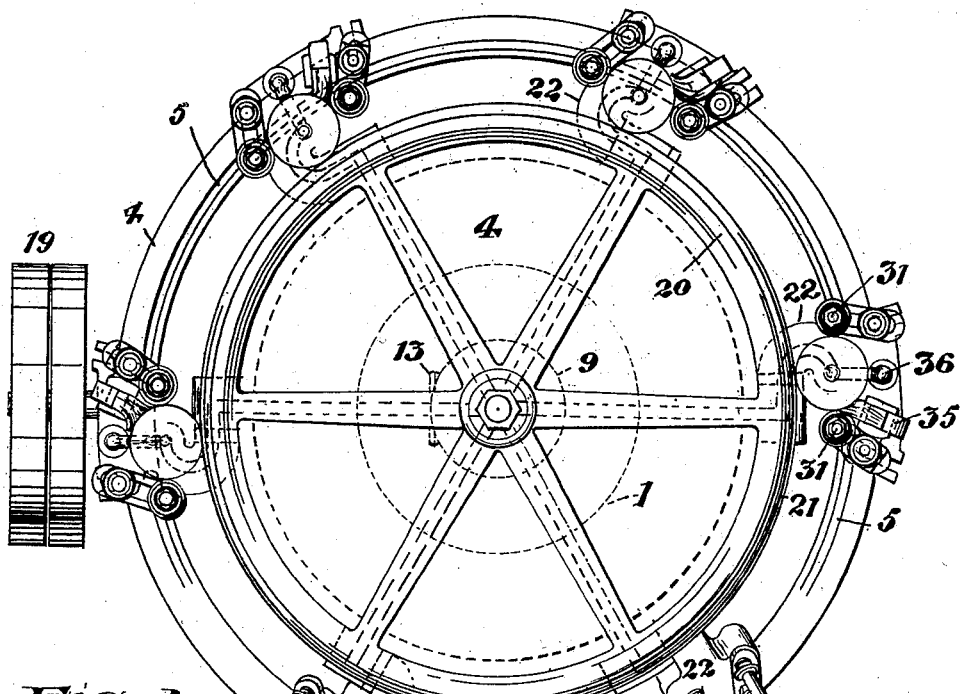
Figure 2:
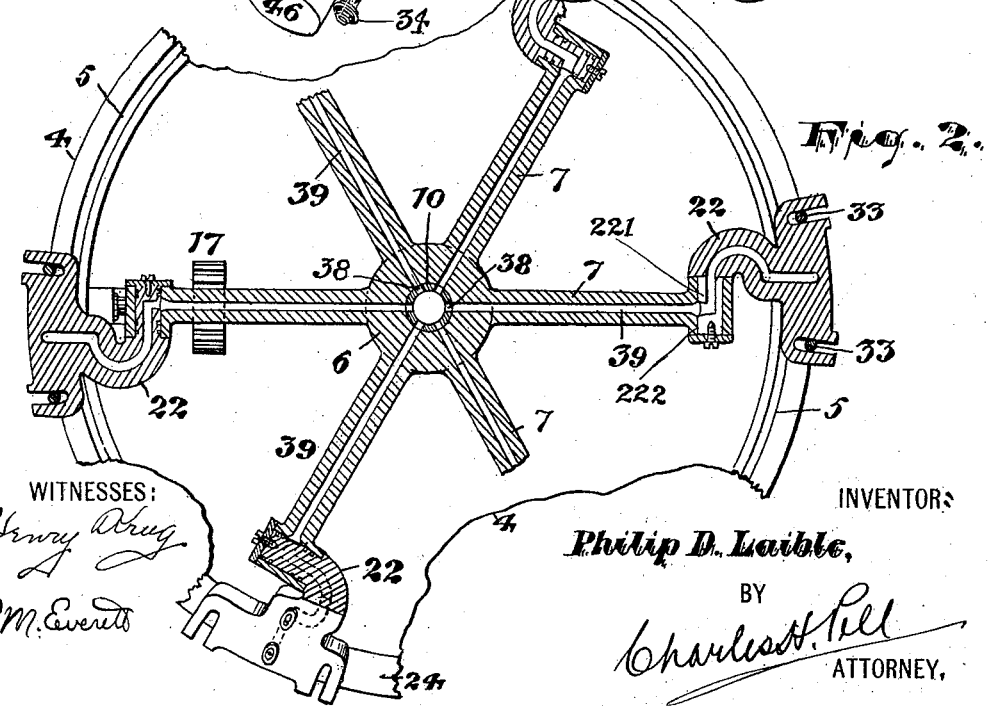
Figure 3:
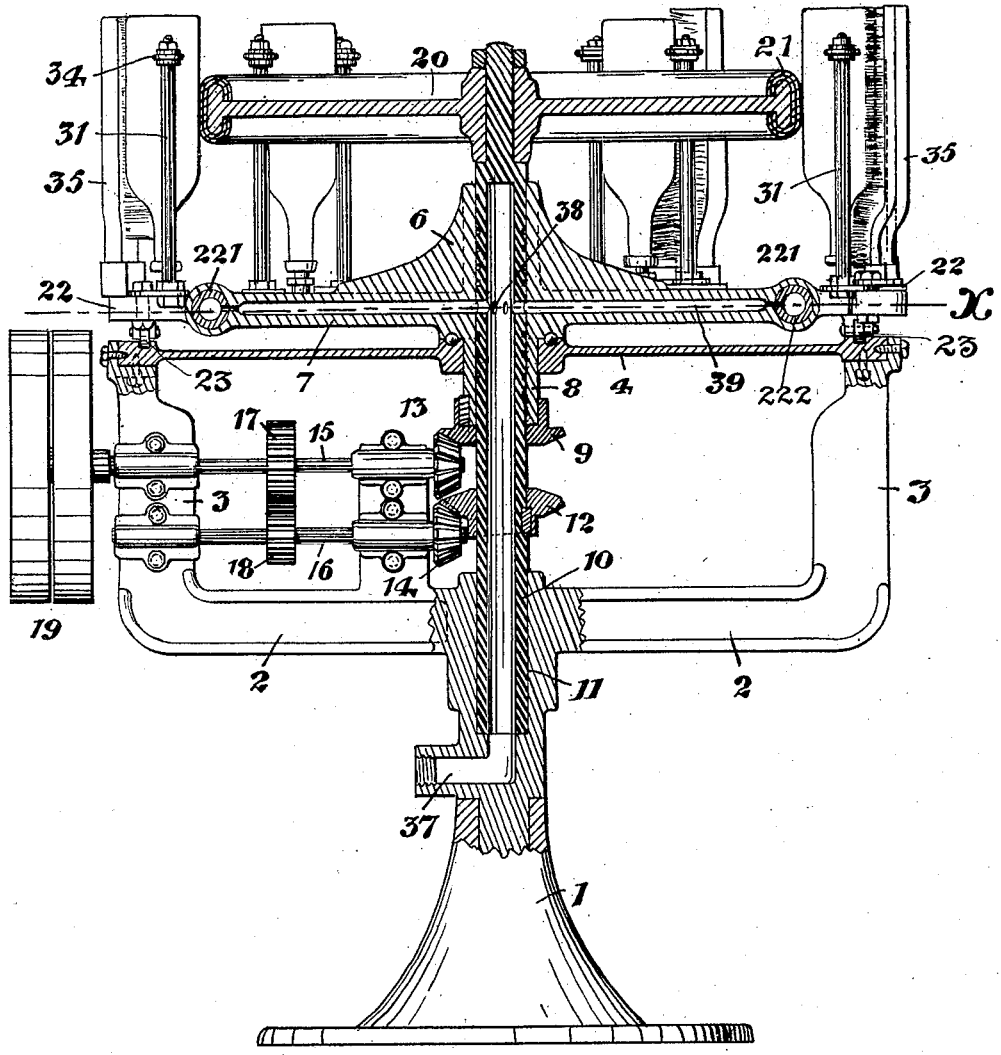

Referring to the accompanying drawings, in which like figures of reference indicate corresponding parts of each of the several figures, Figure 1 is a plan of my improved machine devoid of a certain upper brush for washing the bottoms of the bottles. Fig. 2 is a horizontal section, parts broken away, of the same, taken centrally through the arms of the bottle-carrying frame, as on line *x*, Fig. 3. Fig. 3 is a vertical central section of the machine without the said top brush before referred to. Fig. 4 is a detail plan of one of the bottle-carrying arms with a bottle in place thereon, and Fig. 5 is a similar view with the bottle and holding-guides removed and showing a portion of the track beneath. Fig. 6 is a vertical section of one of the bottle-carrying arms, as on line *y*, Fig. 5; and Fig. 7 shows one of the said bottle-carrying arms in side elevation. Fig. 8 is a central vertical section of the complete machine in its preferred form. Fig. 9 is a plan of a certain top brush which engages the bottoms of the bottles. Fig. 10 is a cross-section of the same, as on line *z*, Fig. 9. Fig. 11 is a plan of a modified form of bottle-carrying arm. Fig. 12 is a detail view of a brush for engaging the interior of a bottle; and Fig. 13 is an edge view of the base-plate upon which the bottle-carrying frame travels, a portion of the outer wall of the track being broken away to disclose the track more clearly. Fig. 14 is an elevation from its outer side of the bottle-carrying arm shown in plan in Fig. 11, the brush being omitted.

In said drawings, 1 indicates a suitable base or standard adapted to support my machine and having at its upper part lateral arms 2 2, bent upward at their ends, as at 3 3, and supporting a circular base-plate 4, upon which the bottle-carrying device travels. Said bottle-carrying device comprises a frame or wheel having a hub 6, with radial arms 7, said hub being seated centrally and rotatably upon the base-plate 4 and having an extension 8 projecting through an aperture in said base-plate 4 and carrying beneath said plate a bevel-gear 9. Axially through said extension 8 and hub 6 of the bottle-carrying frame extends a tubular shaft 10, rotatably seated at its lower end in a socket 11 of the foot or standard 1. Said tubular shaft 10 has keyed upon itself a bevel-gear 12, arranged below the said gear 9 on the bottle-carrying frame, and these gears are engaged, respectively, by driving-gears 13 14 upon horizontal shafts 15 16, having bearings upon one of the arms 2 of the foot or standard of the machine. Said shafts 15 16 are connected by gears 17 18, and one of them carries at its outer end pulleys 19, to receive a driving-belt. (Not shown.) It will thus be seen that by the means described the bottle-carrying frame and central shaft 10 are driven in opposite directions or a relative movement of the same in opposite directions effected. The upper end of the said central shaft 10 is closed and has fixed thereon a horizontally-disposed wheel 20, faced at its outer rim with layers of felt 21, adapted to engage the sides of the bottles to rotate them as they revolve on the carrying-frame, as will be hereinafter more fully described.

Each arm 7 of the bottle-carrying frame has at its outer end a section 22, hinged thereto by inserting its laterally-bent end 221 into a transverse socket 222 of the arm, as is common in pipe-fitting, and whereby said section 22 may tip out of normal horizontal position. Each section 22 is extended at its outer end portion in the direction of the track 5 of the base-plate 4 and has at its under side a wheel 23, adapted to travel in said track 5, which is preferably a groove formed in the base-plate 4. For the greater part of its length said groove or track 5 is of such height as to hold the hinged sections 22 in horizontal position; but at that side of the machine at which the operator is to stand said track is depressed for a distance of seventy-five degrees, more or less, as at 24 in Fig. 13, whereby the hinged sections 22 will be allowed to drop and throw the bottles carried upon them out of vertical position, and therefore out of engagement with the rotating wheel 20. This permits a bottle which has been washed to be removed and an unwashed bottle inserted in its place before the carrying-section 22 again reaches the elevated portion of the track.

It will be understood that the bottles before coming to my machine have been soaked in water, and it is the function of my device to brush and rinse the entire outer surfaces of the said bottles. To effect such a brushing, therefore, each hinged bottle-carrying section 22 is provided with an upright brush adapted to enter a bottle 46, inverted upon the same, and engage its entire inner surface as the bottle is rotated. Said brush comprises a tube 26, preferably having a spiral series of bristles 27 applied thereto and increasing in length toward the top of the brush, although I may under some conditions employ a strip of rubber 28, as shown in Fig. 27, for instance. At the top of the tube 26 is a resilient tuft 271, adapted to be bent over by the pressure of the bottom of the bottle and lie flat against said bottom to clean the same. Under some conditions I may employ instead of said tuft 271 a hinged piece 29, having a rubber blade 30, as shown in Figs. 6 and 7, but which will effect the same result.

At each side of the bottle-receiving brush described are standards 31, mounted by means of slotted feet 32 and clamping-nuts 33 upon the hinged section 22, and carrying at their upper ends rollers 34, preferably rubber-faced, to engage the outer surface of the bottle and hold the same in position. Two of these bearing-rollers 34 may be employed at opposite sides of the bottle, as shown in Fig. 4, although I prefer to employ three, as shown in Fig. 11, in which case the additional one is carried upon an arm 311, from the standard upon which one of the others is directly mounted. A brush 35 is also stationed upon the hinged section 22 to engage the outer surface of the bottle, and, if desired, I may employ a tube 36 (shown in Figs. 4 to 7) to supply water to the outside of the bottles. As the bottle is being cleansed a stream of water is conducted to the tubular shaft 10 by means of a suitable connecting-passage 37 upon the standard 1 of the machine, and the upper part of the passage of said shaft is perforated, as at 38, to communicate with longitudinal tubular channels 39 of the arms 7 of the bottle-carrying frame, said channels extending through the joints of said arms into the hinged sections 22 and communicating with the tubular back of the interior brushes 25 and with the tube 36, where the latter is used. These tubes thus supply the water through their apertures 251 361, respectively, to the bottle-surface. As illustrated in Fig. 6, the adjacent ends of the water-passages of the arm 7 and its hinged section 22 coincide or are in alinement when the said hinged section is in normal horizontal position, and thus a flow of water to the bottle is permitted to wash the same. When, however, the hinged section tips downward on the depressed portion of the track for removing a washed bottle and replacing it with an unwashed one, the adjacent ends of the passage do not register at the joint of the arm, and the flow of water is shut off to facilitate the work of the operator in charging bottles.

To engage the outer surface of the bottoms of the bottles as the same are carried around upon the carrying-frame, I have provided a curved brush 40, adjustably supported upon standards 41 from the base-plate 4, and having at its under surface bristles 42 to engage the bottle-bottoms. Water is supplied to said brush 40 by an independent pipe 43, extending around the inner side of said brush, as at 44, and having lateral apertures 45 to throw streams out through the bristles at their bases.

In operation a constant supply of water having been turned on both through the passage 37 and to the brush 40, the machine is continuously rotated and tended by two operators, one of whom places a bottle upon each hinged section just before it reaches the end of the depressed portion 24 of the track and the other of whom removes such bottle as it comes around to the other end of said depressed portion. In this manner a bottle is washed by each revolution of one of the bottle-carrying arms 7, and the capacity of my machine is limited only by the number of said arms and the speed at which said arms may be revolved and yet permit the operators to remove and replace bottles.

Obviously the machine can be adapted to different sizes of bottles, as either quarts or pints, by shifting the guides 31 and brush 35 upon each hinged section 22.

Having thus described the invention, what I claim as new is—

1. In a bottle-washing machine, the combination of a horizontally-revolving frame having radial extensions or sections hinged to swing in vertical plane, an upright interior brush upon each section adapted to receive upon itself an inverted bottle, other brushes adapted to engage the exterior of the bottle, means for supplying water, an interrupted track beneath said hinged sections, and means for rotating each bottle upon its interior brush.

2. In a bottle-washing machine, a revolving frame, means upon said frame for rotatably supporting bottles, brushes upon said frame adapted to engage said bottles, a driving-wheel concentric with said frame and adapted to engage the bottles to rotate them on their supports independent of the motion of the frame, and water-supply means.

3. In a bottle-washing machine, a revolving bottle-carrying frame, interior and exterior bottle-brushes upon said frame in relatively fixed relation to each other, a driving-wheel independent of said brushes and said frame, adapted to engage the bottles to rotate them, and water-supply means.

4. In a bottle-washing machine, a revolving bottle-carrying frame, interior and exterior bottle-brushes upon said frame in relatively fixed relation to each other, a driving-wheel independent of said brushes and said frame, adapted to engage the bottles to rotate them, bearing-rollers upon said frame adapted to hold the bottles against said driving-wheel, and water-supply means.

5. In a bottle-washing machine, the combination of a series of traveling hinged sections each adapted to rotatably support a bottle, means for rotating said bottles, and a track for said sections having a portion of different altitude from the main portion and adapted to tip said hinged sections and disengage the bottles from said rotating means.

6. In a bottle-washing machine, the combination of a series of traveling hinged sections each adapted to rotatably support a bottle, means for rotating said bottles, a track for said sections having a portion of different altitude from the main portion and adapted to tip said hinged sections and disengage the bottles from said rotating means, and brushes adapted to brush the bottles while being rotated.

7. In a bottle-washing machine, the combination of a series of traveling hinged sections each adapted to rotatably support a bottle, means for rotating said bottles, a track for said sections having a portion of different altitude from the main portion and adapted to tip said hinged sections and disengage the bottles from said rotating means, brushes to engage the bottles, and means adapted to supply water to the bottles while rotating and to shut off the water when the bottle-carrying sections are tipped.

8. In a bottle-washing machine, a revolving frame having radial arms or extensions hinged to swing in a direction perpendicular to their plane of revolution, means for rotatably supporting a bottle on each section, brushes upon each section adapted to engage the interior and the exterior of the bottle, a driving-wheel concentric with said radial arms or extensions, guiding means swinging said frame-sections to alternately throw the bottles against said driving-wheel and disengage them therefrom, and a water-supply.

9. In a bottle-washing machine, the combination of a revolving frame having radial hinged sections each adapted to rotatably support an inverted bottle, means adapted to frictionally engage the bottles when the carrying-sections are in normal position, and a track beneath said sections, having a depressed portion adapted to allow the said hinged sections to drop out of normal position and disengage the said bottles from said rotating means.

10. In a bottle-washing machine, a revolving frame, supporting means upon said frame for rotatably holding an annular series of bottles, a driving-wheel having a padded periphery adapted to engage the inner side of said series of bottles to rotate them, brushes arranged to engage the bottles, and water-supply means.

11. In a bottle-washing machine, a revolving frame for rotatably holding an annular series of bottles, a driving-wheel having a broad tire of felt adapted to engage the inner side of said series of bottles to rotate them, brushes arranged to engage the bottles, and water-supply means.

12. In a bottle-washing machine, a revolving frame having radial arms or sections hinged to swing in a direction at right angles to their plane of revolution, means on each section for rotatably supporting a bottle, a brush upon each section adapted to enter the interior of a bottle thereon, other brushes adapted to engage the exterior of a bottle, a driving-wheel concentric with said frame and adapted to peripherally engage the bottles to rotate them, means for swinging said sections alternately against and away from said driving-wheel, and a water-supply.

In testimony that I claim the foregoing I have hereunto set my hand this 28th day of May, 1903.

PHILIP D. LAIBLE.

Witnesses:
CHARLES H. PELL,
RUSSELL M. EVERETT.